(12) United States Patent
Kotera et al.

(10) Patent No.: US 10,407,033 B2
(45) Date of Patent: Sep. 10, 2019

(54) ELECTRIC BRAKE DEVICE (71) Applicant: MITSUBISHI JIDOSHA KOGYO KABUSHIKI KAISHA, Tokyo (JP)

(72) Inventors: Haruo Kotera, Tokyo (JP); Hiromitsu Toyota, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 217 days.

(21) Appl. No.: 15/515,454

(22) PCT Filed: May 10, 2016

(86) PCT No.: PCT/JP2016/063811
§ 371 (c)(1),
(2) Date: Mar. 29, 2017

(87) PCT Pub. No.: WO2017/002453
PCT Pub. Date: May 1, 2017

(65) Prior Publication Data
US 2017/0210361 A1    Jul. 27, 2017

(30) Foreign Application Priority Data
Jul. 2, 2015    (JP) .................................. 2015-133304

(51) Int. Cl.
*B60T 8/17*    (2006.01)
*B60T 7/12*    (2006.01)
(Continued)

(52) U.S. Cl.
CPC ................ *B60T 8/17* (2013.01); *B60T 7/042* (2013.01); *B60T 7/107* (2013.01); *B60T 7/12* (2013.01);
(Continued)

(58) Field of Classification Search
CPC . B60T 8/17; B60T 7/107; B60T 7/042; B60T 13/741; B60T 7/12; B60T 17/18;
(Continued)

(56) References Cited

U.S. PATENT DOCUMENTS 6,476,515 B1 * 11/2002 Yamamoto .............. B60T 7/042
303/122.02
6,749,269 B1 * 6/2004 Niwa .................... B60T 13/741
303/115.2
(Continued)

FOREIGN PATENT DOCUMENTS

| JP | 2000-16258 A | 1/2000 |
|---|---|---|
| JP | 2000-225935 A | 8/2000 |
| WO | WO 2012/121199 A1 | 9/2012 |

OTHER PUBLICATIONS

Extended European Search Report, dated Mar. 28, 2019, for European Application No. 16817562.8.

*Primary Examiner* — Adam R Mott
(74) *Attorney, Agent, or Firm* — Birch, Stewart, Kolasch & Birch, LLP (57) ABSTRACT

An electric brake device has at least three control units: a first front wheel control unit for controlling a front-left wheel brake mechanism and a front-right wheel brake mechanism; a second front wheel control unit again for controlling the front-left wheel brake mechanism and the front-right wheel brake mechanism; and a rear wheel control unit for controlling a rear-left wheel brake mechanism and a rear-right wheel brake mechanism. In case of failure of at least one of the three control units, at least one of the non-defective other control units temporarily reduces the braking force of the target brake mechanism.

7 Claims, 6 Drawing Sheets

(51) Int. Cl.
*B60T 13/74* (2006.01)
*B60T 7/04* (2006.01)
*B60T 7/10* (2006.01)
*F16D 55/226* (2006.01)
*F16D 65/18* (2006.01)
*B60T 8/1766* (2006.01)
*B60T 8/88* (2006.01)

(52) U.S. Cl.
CPC ............ *B60T 8/1766* (2013.01); *B60T 8/885* (2013.01); *B60T 13/741* (2013.01); *F16D 55/226* (2013.01); *F16D 65/183* (2013.01); *B60T 2270/402* (2013.01)

(58) Field of Classification Search
CPC .. B60T 13/74; B60T 2270/402; F16D 65/183; F16D 55/226
See application file for complete search history.

(56) References Cited

U.S. PATENT DOCUMENTS

| | | |
|---|---|---|
| 9,126,599 B2 | 9/2015 | Ozaki |
| 2011/0320099 A1* | 12/2011 | Kim ........................ B60T 8/885 701/70 |

* cited by examiner

ELECTRIC BRAKE DEVICE

CROSS REFERENCE TO RELATED APPLICATIONS

This application is the National Phase of PCT International Application No. PCT/JP2016/063811, filed on May 10, 2016, which claims priority under 35 U.S.C. 119(a) to Patent Application No. 2015-133304, filed in Japan on Jul. 2, 2015, all of which are hereby expressly incorporated by reference into the present application.

TECHNICAL FIELD

This disclosure relates to an electric brake device having a friction-receiving member that rotates together with a wheel; and a friction-applying member that moves while being powered by an electric actuator, and obtains the braking force by pressing the friction-applying member against the friction-receiving member.

BACKGROUND ART

In recent years, as an alternative for the conventional hydraulic brake, there has been developed an electric brake device designed to obtain braking force by pressing a friction-applying member, such as brake pad, against a friction-receiving member such as brake disk, with the aid of an electric actuator.

The brake device is a critical mechanism of vehicles, and employs a redundant system by which the vehicles can safely stop even in case of brake failure.

For example, Patent Literature 1 below discloses an electrically controlled brake system that includes a brake for limiting rotation of wheels, a power unit, and a brake control unit for controlling the operational state of the brake by controlling electric energy supplied from the power unit; the brake system further includes, disposed between the power source and the brake control unit, a switching device that performs switching from a connected state to a disconnected state in association with braking operation of a brake operating member; the brake control unit includes a switchover unit that toggles between a coupled mode in which the operation of a mechanical brake that operates in association with motion of a brake operating member is coupled to the brake operating member, and a decoupled mode in which the operation is decoupled from the brake operating member, and a switchover unit control unit that performs, in case of failure of the electrically controlled brake system, switching from the decoupled mode to the coupled mode.

CITATION LIST

Patent Literature

Patent Literature 1: JP-A-2000-225935

Technical Problem

The above-described prior art is designed to obtain braking force, in case of failure of the electrically controlled brake system, by activating the mechanical brake. There is however a need for providing the mechanical brake in addition to an electrically controlled brake system, posing an issue of increasing the vehicle cost.

In addition, the above-described prior art has described that four control units are provided for four wheel braking mechanisms, but has not described a system that can control four wheel braking mechanisms with three or less control units, leaving a room for further improvement.

This disclosure, made in consideration of the above-described circumstances, is to improve convenience of the electric brake device.

Solution to Problem

In pursuit of achieving the above-described object, according to one embodiment, there is provided an electric brake device for a vehicle, which include a first brake mechanism for braking a first wheel, a second brake mechanism for braking a second wheel, a third brake mechanism for braking a third wheel, a fourth brake mechanism for braking a fourth wheel, and at least three control units; wherein each control unit controls at least any one of the four brake mechanisms, and in case of failure of at least one of the three control units, at least one of the non-defective other control units temporarily reduces the braking force of its target brake mechanism.

According to one embodiment, there is provided such electric brake device, in case of failure of at least one of the three control units, one of the non-defective other control units increases the braking force of its target brake mechanism; and other one of the non-defective other control units temporarily reduces the braking force of its target brake mechanism, and then increases the braking force of its target brake mechanism in conjunction with increasing of the braking force by the one of the non-defective other control units.

According to one embodiment, there is provided such electric brake device, wherein the first wheel and the second wheel are arranged leaving a space in between in a width direction of the vehicle; and the third wheel and the fourth wheel are arranged leaving a space in between in the width direction, and also arranged leaving a space from the first wheel and the second wheel in a length direction of the vehicle; the three control units are a first control unit, a second control unit and a third control unit; the first control unit controls the first brake mechanism and the second brake mechanism, the second control unit controls the first brake mechanism and the second brake mechanism, and the third control unit controls the third brake mechanism and the fourth brake mechanism.

According to one embodiment, there is provided such electric brake device, wherein an ideal braking force distribution value in the length direction of vehicle is preset, between a first brake pair composed of the first brake mechanism and the second brake mechanism, and a second brake pair composed of the third brake mechanism and the fourth brake mechanism, and the non-defective other control unit temporarily reduces the braking force of its target brake mechanism to a value that is lower than the ideal braking force distribution value.

According to one embodiment, there is provided such electric brake device, wherein each of the brake mechanisms is connected to a main battery and a backup battery that serve as power sources for controlling and activating the brake mechanisms, and, in case of main battery failure, the power source for each brake mechanism is switched to the backup battery.

According to one embodiment, there is provided such electric brake device, wherein the main battery and the backup battery supply power preferentially to the brake mechanisms that brake the front wheels of the vehicle.

According to one embodiment, there is provided such electric brake device, wherein the first wheel is a front left wheel, the second wheel is a front right wheel, the third wheel is a rear left wheel, the fourth wheel is a rear right wheel; the first brake mechanism is a front left wheel brake mechanism, the second brake mechanism is a front right wheel brake mechanism, the third brake mechanism is a rear left wheel brake mechanism, the fourth brake mechanism is a rear right wheel brake mechanism; the first control unit is a first front wheel control unit, the second control unit is a second front wheel control unit, and the third control unit is a rear wheel control unit.

According to one embodiment, there is provided such electric brake device, wherein, in case of failure of at least one of the first control unit and the second control unit, the third control unit temporarily reduces the braking forces of the rear left wheel brake mechanism and the rear right wheel brake mechanism.

Advantageous Effects of Invention

According to one embodiment, in case of failure of one of the three control units, at least one of the non-defective control units temporarily reduces the braking force, posing an advantage of keeping a proper state of the braking force distribution between the wheel pairs, even if the braking force of the target brake mechanism under the control of the defective control unit should sharply fall.

According to one embodiment, in case of failure of one control unit, one of the non-defective other control units increases the braking force, and still another one of the other control units temporarily reduces the braking force, and then increases the braking force in conjunction with increase of the braking force given by such one of the other control units, posing an advantage of reserving the braking force for the entire vehicle, while preventing wheel lock.

According to one embodiment, the first brake mechanism and the second brake mechanism are controlled by two control units, posing an advantage of enhancing availability of the first brake mechanism and the second brake mechanism.

According to one embodiment, the non-defective control unit reduces the braking force based on the ideal braking force distribution value preset to the vehicle, posing an advantage of stabilizing the vehicle posture during braking.

According to one embodiment, there are provided two batteries for supplying power to each brake mechanism, making it possible to allow a sub-battery to activate the brake mechanism even in case of failure of the main battery, posing an advantage of improving redundancy of the brake mechanism.

According to one embodiment, the main battery and the sub-battery supplies power preferentially to the front wheel brake mechanisms, posing an advantage of improving redundancy of the front wheel brake mechanisms whose importance in braking is higher.

According to one embodiment, two control units are allocated to the brake mechanisms of the left and right front wheels, and a single control unit is allocated to the brake mechanisms for the left and right rear wheels, so that if one control unit should go into failure, the residual front wheel brake mechanism remains controllable, posing an advantage of improving redundancy of the front wheel brake mechanisms whose importance in braking is higher.

According to one embodiment, in case of failure of at least one of the control units controlling the front wheel brake mechanisms, the control unit that controls the rear wheel brake mechanisms temporarily reduces the braking force, posing an advantage of keeping the braking force distribution over the front and rear wheels within a proper range, when the braking force of the front wheel brake mechanisms sharply feel.

DESCRIPTION OF EMBODIMENTS

Preferred embodiments of the electric brake device of this disclosure will be detailed below, referring to the attached drawings.

Figure 1:
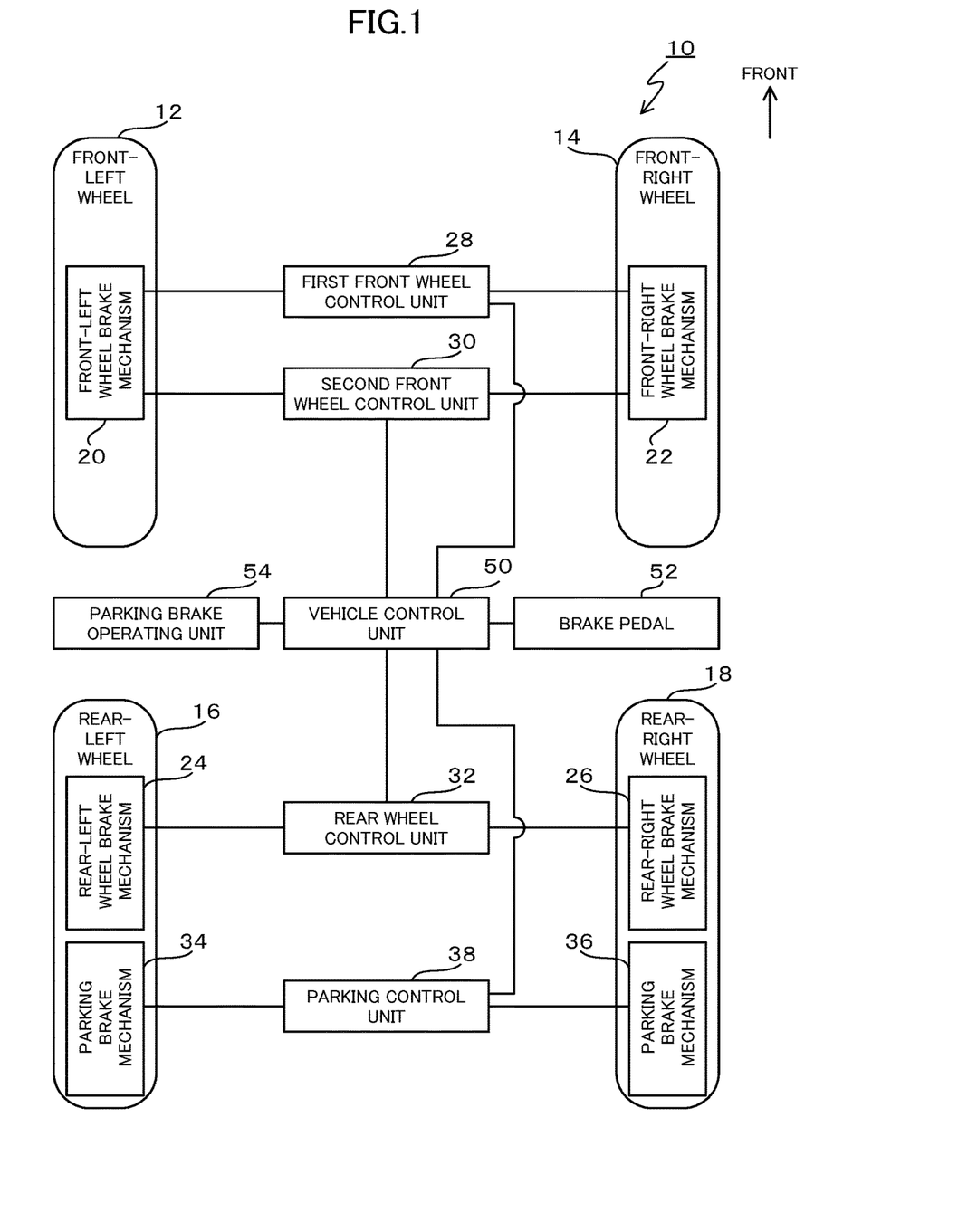
FIG. 1 is an explanatory drawing illustrating a configuration of an electric brake device 10 according to an embodiment.

FIG. 1 is an explanatory drawing illustrating a configuration of an electric brake device 10 according to an embodiment.

The electric brake device 10 is configured to contain front, rear, left and right wheels 12, 14, 16, 18; brake mechanisms 20, 22, 24, 26, 34, 36 respectively provided to the wheels; control units 28, 30, 32, 38, 50; and operating units 52, 54.

Note that, in addition to the configuration illustrated in FIG. 1, the electric brake device 10 also has a main battery 40 and a backup battery 42 (see FIG. 2), but not shown in FIG. 1.

In more detail, the wheels 12, 14, 16, 18 are the front-left wheel 12, the front-right wheel 14, the rear-left wheel 16, and the rear-right wheel 18. There are provided the front-left wheel brake mechanism 20 to the front-left wheel 12; the front-right wheel brake mechanism 22 to the front-right wheel 14; the rear-left wheel brake mechanism 24 to the rear-left wheel 16; and the rear-right wheel brake mechanism 26 to the rear-right wheel 18, respectively, making it possible to brake the respective wheels.

The individual brake mechanisms 20, 22, 24, 26 configure service brakes, and are respectively provided with control units 28, 30, 32.

Each of the control units 28, 30, 32 controls at least one of the brake mechanisms 20, 22, 24, 26.

In this embodiment, the front left wheel brake mechanism 20 and the front right wheel brake mechanism 22 are controlled by both of the first front wheel control unit 28 and the second front wheel control unit 30, and the rear left wheel brake mechanism 24 and the rear right wheel brake mechanism 26 are controlled by the rear wheel control unit 32.

In other words, the first front wheel control unit 28 as the first control unit controls the front left wheel brake mechanism 20 and the front right wheel brake mechanism 22; the second front wheel control unit 30 as the second control unit controls the front left wheel brake mechanism 20 and the front right wheel brake mechanism 22; and the third front wheel control unit 32 as the third control unit controls the rear left wheel brake mechanism 24 and rear right wheel brake mechanism 26.

The parking control unit 38 controls the parking brake mechanisms 34, 36.

The individual control units 28, 30, 32, 38 are connected to the vehicle control unit 50 that takes part in main control of the vehicle.

The vehicle control unit 50 is connected to a brake pedal (service brake operating unit) 52 and a parking brake operating unit 54, and outputs, when the brake pedal 52 or the parking brake operating unit 54 is operated, a control signal that directs the individual control units 28, 30, 32, 38 to activate the brake.

The vehicle control unit 50 also monitors the operating status of the individual control units 28, 30, 32, 38, and outputs, when any of the control units 28, 30, 32, 38 should go into failure, a control signal that notifies other control units of the failure.

Note that, in place of notifying the failure of the control units 28, 30, 32, 38 by way of the vehicle control unit 50, the individual control units 28, 30, 32, 38 may be connected directly so as to allow them to monitor each other.

Each of the brake mechanisms 20, 22, 24, 26 is an electric brake mechanism (electro-mechanical brake: EMB) that has a friction-receiving member that rotates together with a wheel, and a friction-applying member that moves while being powered by an electric actuator, and obtains the braking force by pressing the friction-applying member against the friction-receiving member.

In more detail, each of the brake mechanisms 20, 22, 24, 26 has a brake disk (friction-receiving member) that rotates together with the wheel, and an electric caliper that has a brake pad movable between the pressing position and the non-pressing position relative to the brake disk by aid of the electric actuator.

In the normal state (non-braking state), the brake pad is positioned at the non-pressing position away from the brake disk. When braking, the control units 28, 30, 32 activate the electric actuator to move the brake pad to the pressing position where the pad comes into contact with the brake disk, thereby kinetic energy of the wheels is converted into thermal energy, and the vehicle is slowed down to a desired speed.

Figure 3:
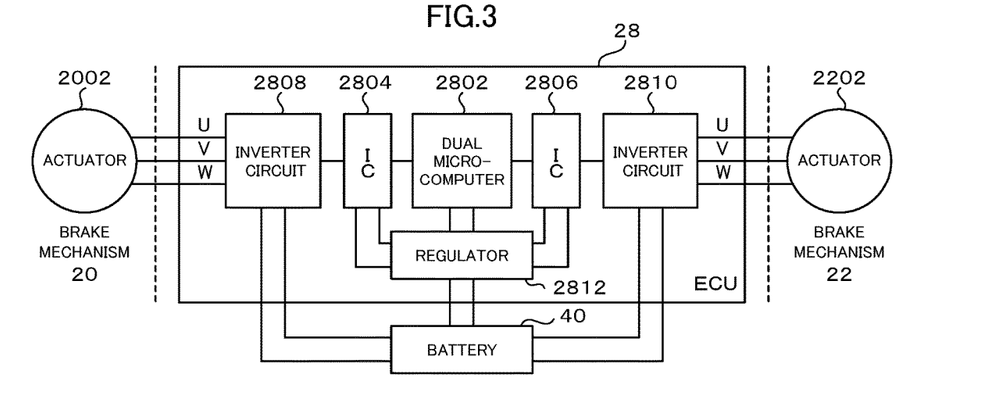
FIG. 3 is an explanatory drawing illustrating an exemplary schematic configuration of a control unit.

FIG. 3 is an explanatory drawing illustrating an exemplary schematic configuration of the control units.

In this embodiment, each of the control units 28, 30, 32 controls two brake mechanisms, and has the same configuration. FIG. 3 illustrates the first front wheel control unit 28.

The first front wheel control unit 28 is configured to contain a dual microcomputer 2802, two integrated circuits (ICs) 2804, 2806, two bridge (inverter) circuits 2808, 2810, and a power source regulator 2812. The power source regulator 2812 and the individual bridge circuits 2808, 2810 are connected to the battery 40.

The dual microcomputer 2802 is connected to the vehicle control unit 50 (not illustrated in FIG. 3), and, when a brake activation instruction was issued from the vehicle control unit 50, activates the bridge circuits 2808, 2810 to convert electric power of the main battery 40 into three-phase AC power, and supplies the power to the electric actuators 2002, 2202 of the brake mechanisms (the front left wheel brake mechanism 20 and the front right wheel brake mechanism 22 in FIG. 3) to thereby activate the electric actuators 2002, 2202. In other words, the first front wheel control unit 28 contains power source circuits of the front left wheel brake mechanism 20 and the front right wheel brake mechanism 22.

Since operations of the bridge circuits 2808, 2810 are controllable independently, so that the individual electric actuators 2002, 2202 (the front left wheel brake mechanism 20 and the front right wheel brake mechanism 22) may be put into operation independently.

As described above, the front left wheel brake mechanism 20 and the front right wheel brake mechanism 22 are controlled by the first front wheel control unit 28 and the second front wheel control unit 30, wherein in the normal state, each of the first front wheel control unit 28 and the second front wheel control unit 30 equally supplies a half of the power required by the front left wheel brake mechanism 20 and the front right wheel brake mechanism 22.

Since the electric brake mechanism controls operations of the brake mechanism by electric signals, so that the operations of the brake mechanism may be controlled finely depending on situations, thus making it no more necessary to use hydraulic piping, and making it possible to considerably reduce the vehicle weight.

As illustrated in FIG. 2, the individual brake mechanisms 20, 22, 24, 26 in this embodiment are connected to the main battery 40 and the backup battery 42, allowing that if the main battery 40 should go into failure, the supply source of power towards the individual brake mechanisms 20, 22, 24, 26 is switched to the backup battery 42. This improves availability of the brake mechanisms 20, 22, 24, 26.

The main battery 40 and the backup battery 42 are designed to supply power preferentially to the brake mechanisms 20, 22 of left and right front wheels.

Referring now back to FIG. 1, the rear-left wheel 16 and the rear-right wheel 18 are further provided with the parking brake mechanisms 34, 36, respectively. The parking brake mechanisms 34, 36 are mainly used for preventing parked vehicles from moving.

The parking brake mechanisms 34, 36 are controlled by the parking control unit 38.

In this embodiment, each of the parking brake mechanisms 34, 36 is an electric parking brake (EPB), and may be configured in various ways.

FIG. 2 is an explanatory drawing illustrating an exemplary configuration of the parking brake in the electric brake device 10.

In FIG. 2, EMB 20 corresponds to the front-left wheel brake mechanism 20, EMB 22 to the front-right wheel brake mechanism 22, EMB 24 to the rear-left wheel brake mechanism 24, and EMB 26 to the rear-right wheel brake mechanism 26.

ECU 28 corresponds to the first front wheel control unit 28, ECU 30 corresponds to the second front wheel control unit 30, and ECU 32 corresponds to the rear wheel control unit 32, respectively.

EPB 38 corresponds to the parking control unit 38.

Figure 2A:
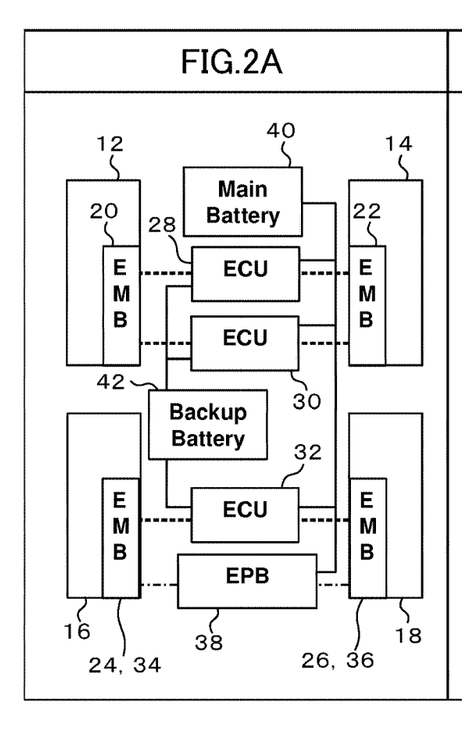
FIG. 2 is an explanatory drawing illustrating an exemplary configuration of a parking brake in the electric brake device 10.

In the design illustrated in FIG. 2A, the rear-left wheel brake mechanism 24 and the rear-right wheel brake mechanism 26 also function as the parking brake mechanisms 34, 36, respectively.

More specifically, when using the parking brake, the parking control unit 38 activates the electric actuators of the rear-left wheel brake mechanism 24 and the rear-right wheel brake mechanism 26, the brake pads then move to the pressing position relative to the brake disk, to thereby apply braking force to the rear-left/right wheels 16, 18.

With such configuration, a brake mechanism solely for parking is no more necessary, and the vehicle weight may be reduced.

Figure 2B:
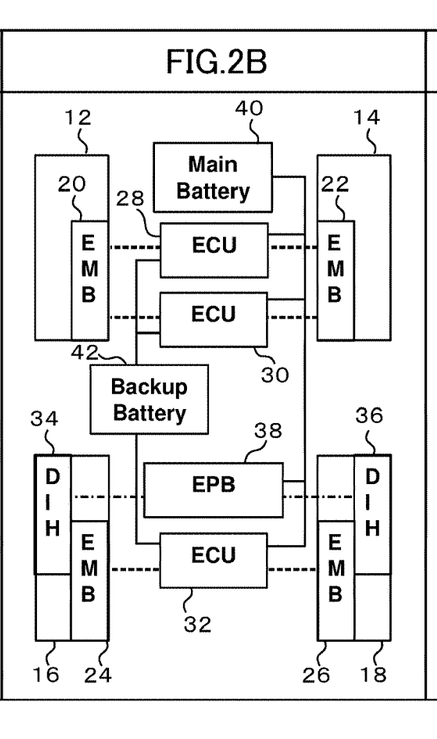

FIG. 2B illustrates an exemplary configuration of the parking brake mechanisms 34, 36 based on the drum-in-hat (DIH) system, in which a brake drum is disposed in the brake disk of the rear-left wheel brake mechanism 24 and the rear-right wheel brake mechanism 26.

More specifically, the parking brake mechanisms 34, 36 have brake drums respectively disposed in the hats positioned at the center of the brake pads of the rear-left wheel brake mechanism 24 and the rear-right wheel brake mechanism. 26, and rotate together with the wheels; and brake shoes provided inside the individual brake drums, and movable between the pressing position and the non-pressing position relative to the brake drums while being powered by the electric actuators for parking.

In the normal state (non-braking state for parking), each brake shoe is energized by a spring towards the inner circumference of the brake drum, and is kept at the non-pressing position away from the brake drum. To the brake shoe, there is also attached a brake shoe lever whose one end is attached to the brake shoe in a swingable manner, and whose other end has a wire attached thereto.

When the wire is pulled (wound) by the electric actuator for parking, the brake shoe lever swings, the brake shoe moves towards the outer circumference of the brake drum against the energizing force of the spring, and positions itself at the pressing position relative to the brake drum.

As described above, when operating the parking brake, the parking control unit 38 activates the electric actuator for parking, moves the brake shoes of the parking brake mechanisms 34, 36 to the pressing position relative to the brake drum, to thereby apply the braking force to the rear-left/right wheels 16, 18.

Figure 2C:
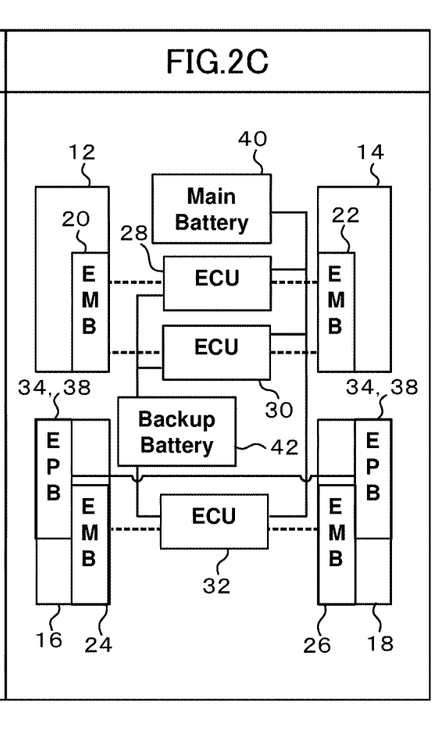

FIG. 2C illustrates an exemplary configuration of the brake drum-type electric parking brake mechanisms 34, 36 built in the brake disks of the rear-left wheel brake mechanism 24 and the rear-right wheel brake mechanism 26.

More specifically, the parking brake mechanisms 34, 36 have the brake drums that are provided in the hat positioned at the center of the brake disks of the rear-left wheel brake mechanism 24 and the rear-right wheel brake mechanism 26, and rotate together with the wheels; and the brake shoes provided inside the individual brake drums, and is movable between the pressing position and the non-pressing position relative to the brake drum while being powered by the electric actuator for parking. The parking control unit 38 is configured integrally with each of the parking brake mechanisms 34, 36.

In the normal state (non-braking state for parking), the brake shoe is energized towards the inner circumference of the brake drum, and is kept at the non-pressing position away from the brake drum. At one end of the brake shoe, a motor with a linear motion mechanism is attached.

When the motor of the drum-type parking rotates, the brake shoe is pushed on one end while mediated by a linear motion mechanism. When the brake shoe is pressed, it moves towards the outer circumference of the brake drum, and comes into the pressing position relative to the brake drum.

In this way, when operating the parking brake, the parking control unit 38 activates the electric actuator for parking so as to move the brake shoes of the parking brake mechanisms 34, 36 to the pressing position relative to the brake drum, thereby the braking force is applied to the rear-left/right wheels 16, 18.

Next, a control process in case of failure of the electric brake device 10 will be explained.

In general, if three out of the four wheels 12, 14, 16, 18 become unbrakable (only one wheel remains brakable), the braking operation may spin the vehicle, and may tend to turn it to an unintentional direction.

The electric brake device 10 uses three control units 28, 30, 32 to control four brake mechanisms 20, 22, 24, 26 provided to four wheels 12, 14, 16, 18, and in case of failure of two of these control units, three wheels will become uncontrollable, and thereby the vehicle may be spun.

For this reason, in case of braking malfunction of any of the front-left wheel, the front-right wheel, the rear-left wheel and the rear-right wheel, and even in case of failure of any one of, or two control units out of the three control units 28, 30, 32, the electric brake device 10 is designed to leave at least two wheels brakable, so as to keep the steering performance of the vehicle, and so as to reserve a level of braking force necessary to stop the vehicle.

Note that, in this embodiment, failure of the control units 28, 30, 32 means the state that they cannot activate the brake mechanisms 20, 22, 24, 26, and is exemplified by failure of the power source circuit, and signal wire breakage.

Besides those described above, also failure of the brake mechanisms 20, 22, 24, 26, such as failure of the electric actuator and wear of the brake pad, may result in malfunction in wheel braking. Control policies described below will be adoptable for these cases.

FIG. 4 to FIG. 7 are explanatory drawings illustrating changes in the braking force in case of failure of the control unit.

Note that, in FIG. 4 to FIG. 7, ECU1 corresponds to the first front wheel control unit 28, ECU2 corresponds to the second front wheel control unit 30, ECU3 corresponds to the rear wheel control unit 32, and EPB corresponds to the parking control unit 38, respectively.

In the description below, the phrase stating that "the control unit increases (or reduces) the braking force of the brake mechanism" discusses, for example, the magnitude of control exerted from the subject control unit to the brake mechanism, and does not always identify the braking force of the brake mechanism as a whole.

More specifically, for the case where the brake mechanism is controlled by a plurality of control units, even increase in the braking force given by one control unit will not always increase the braking force of the brake mechanism as a whole, typically due to failure of other control units.

Figure 4A:
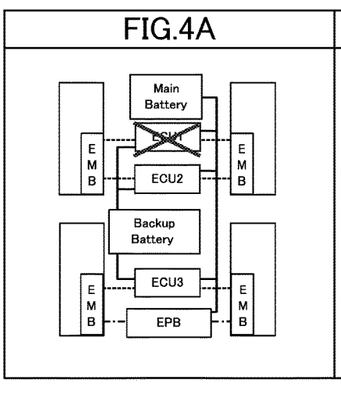
FIG. 4 is an explanatory drawing illustrating changes in braking force in case of control unit failure.

First, an exemplary case where one of the front wheel control units (now in FIG. 4, the first front wheel control unit 28) went into failure, illustrated in FIG. 4A, will be explained.

Figure 4B:
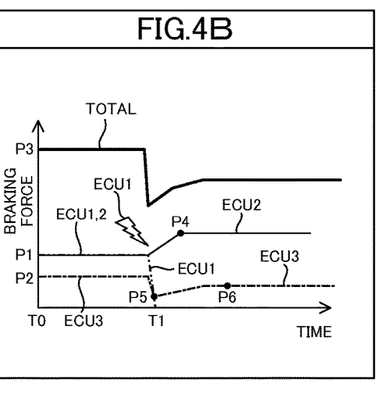

Referring now to FIG. 4B, at the initial time T0 when the failure has not occurred yet, both of the first front wheel control unit 28 and second front wheel control unit 30 (ECU1, 2) operate the brake mechanisms 20, 22 of the left and right front wheels, so as to produce predetermined braking force Pl. In other words, the front left/right wheel brake mechanisms 20, 22 produce a braking force of P1×2 in total.

The rear wheel control unit 32 (ECU3) operates the rear-left/right brake mechanisms 24, 26, so as to produce predetermined braking force P2 (<P1).

The braking force of the three control units 28, 30, 32 totals P3.

If the first front wheel control unit 28 (ECU1) went into failure at time T1, the power is no more supplied from the first front wheel control unit 28 to the left/right front wheel brake mechanisms 20, 22, but supplied only from the second front wheel control unit 30. Thus the total braking force of the front left/right wheel brake mechanisms 20, 22 is halved to P1×1.

In this case, the second front wheel control unit 30 (ECU2) increases the power supply to the front left/right wheel brake mechanisms 20, 22, so as to make the front left/right wheel brake mechanisms 20, 22 produce braking force P4 larger than P1×1.

The rear wheel control unit 32 (ECU3) reduces power to be supplied to the rear left/right wheel brake mechanisms 24, 26, immediately after the first front wheel control unit 28 went into failure, to thereby reduce the braking force of the rear left/right wheel brake mechanisms 24, 26 down to P5 (<P2).

In short, case of failure of at least one of the three control units 28, 30, 32, at least one of the non-defective other control units (the rear wheel control unit 32 in this example) temporarily reduces the braking force of the target brake mechanisms.

This is for the purpose of preventing locking of the rear-left/right wheels 16, 18 (rear-locking) due to reduced braking force of the front wheel brake mechanisms 20, 22.

The rear wheel control unit 32 then increases the braking force of the rear left/right wheel brake mechanisms 24, 26, in conjunction with increase of the braking force of the front left/right wheel brake mechanisms 20, 22, referring to the ideal braking force distribution characteristic of the vehicle.

Figure 8A:
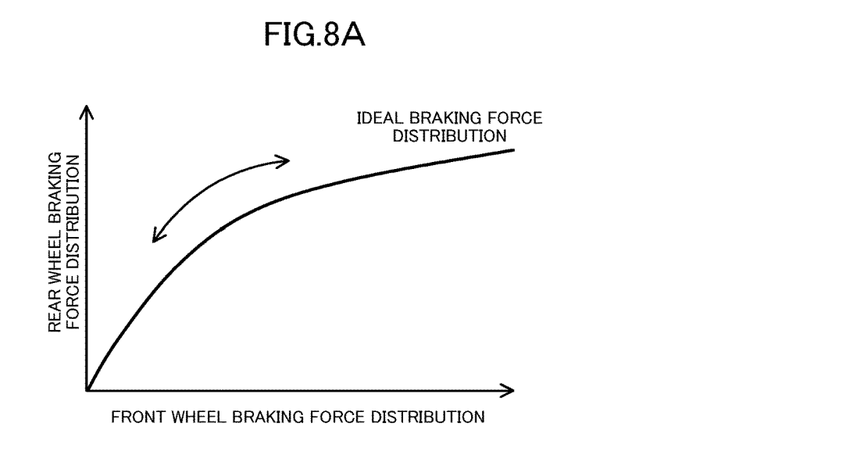
FIG. 8 is an explanatory drawing illustrating ideal braking force distribution characteristics over the front and rear wheels.

FIG. 8 is an explanatory drawing illustrating ideal braking force distribution characteristics over the front and rear wheels.

In FIG. 8, the ordinate represents the braking force distribution for the rear wheels, and the abscissa represents the braking force distribution for the front wheels.

The ideal braking force distribution is given by a curve obtained by plotting the ideal braking force distribution for each friction coefficient. In general, the electric brake device 10 distributes the braking force, that is, the braking force produced by the front left/right wheel brake mechanisms 20, 22, and the braking force produced by the rear left/right wheel brake mechanisms 24, 26, over the front and rear wheels referring to the ideal braking force distribution characteristic shown in FIG. 8A.

Figure 8B:
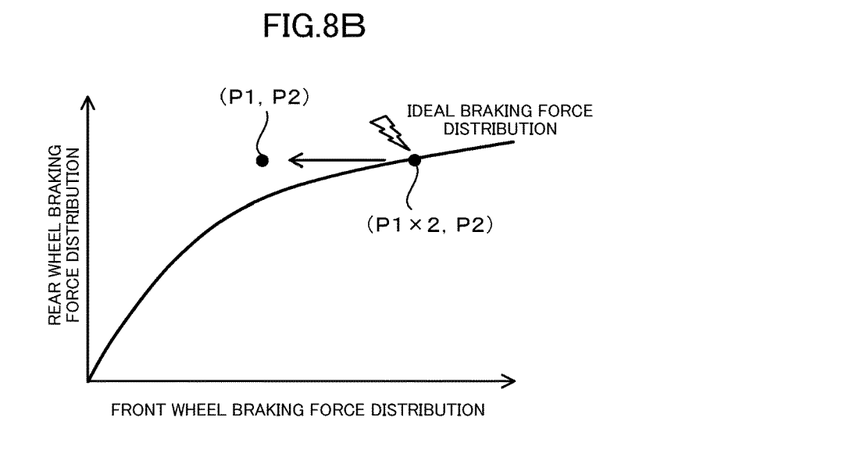

Now in case of failure of the first front wheel control unit 28, as exemplified in FIG. 4, the braking force of the front wheel brake mechanisms 20, 22 is reduced as illustrated in FIG. 8B. In other words, the braking force is reduced from P1×2 down to P1×1. If this state persists, the rear wheels would be locked since the braking force of the rear wheel brake mechanisms 24, 26 surpasses the ideal braking force distribution value.

Figure 8C:
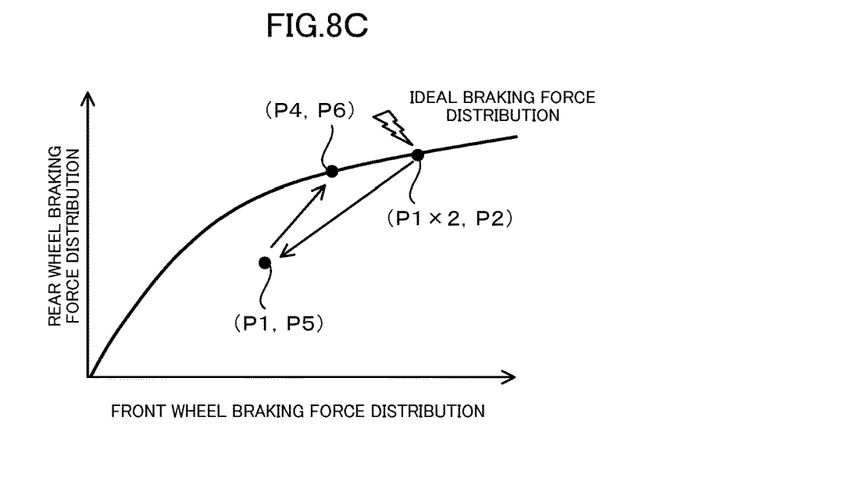

In order to prevent the rear wheel lock, as illustrated in FIG. 8C, the rear wheel control unit 32 largely reduces the braking force of the rear left/right wheel brake mechanisms 24, 26, immediately after the first front wheel control unit 28 went into failure. In the example illustrated in FIG. 8 and FIG. 4, the braking force is reduced down to P5 which is lower than the ideal braking force distribution value.

Thereafter, if the braking force of the front wheel brake mechanisms 20, 22 increased up to P4 with the aid of the second front wheel control unit 30, the rear wheel control unit 32 increases the braking force up to P6 which is a value according to the ideal braking force distribution characteristic of the rear wheel brake mechanisms 24, 26.

The rear wheel control unit 32 adjusts the braking force of the rear wheel brake mechanisms 24, 26 referring to the ideal braking force distribution characteristic, also when the braking force of the front wheel brake mechanisms 20, 22 fell below the level given immediately after the first front wheel control unit 28 went into failure, typically when letting up on braking.

In other words, when at least one of the three control units 28, 30, 32 went into failure, one of the non-defective other control units increases the braking force of the target brake mechanism; meanwhile the other one of the non-defective other control units temporarily reduces the braking force of the target brake mechanism, and then increases the braking force of the target brake mechanisms in conjunction with increase of the braking force given by such one of the non-defective other control units.

In this case, the control unit, whose braking force is reduced, brings the braking force of the target brake mechanism, temporarily down below the ideal braking force distribution value in the length (front-rear) direction of vehicle.

More specifically according to the context of this embodiment, when at least one of the first front wheel control unit 28 and the second front wheel control unit 30 went into failure, the rear wheel control unit 32 temporarily reduces the braking force of the rear left wheel brake mechanism 24 and the rear right wheel brake mechanism 26. In this process, the rear wheel control unit 32 brings the braking force of the rear left wheel brake mechanism 24 and the rear right wheel brake mechanism 26 down below the ideal braking force distribution value preset over the front and rear wheels of vehicle.

In more detail, when at least one of the first front wheel control unit 28 and the second front wheel control unit 30 went into failure, the other one of the first front wheel control unit 28 and the second front wheel control unit 30 increases the braking force of the front left wheel brake mechanism 20 and the front right wheel brake mechanism 22; meanwhile the rear wheel control unit 32 temporarily reduces the braking force of the rear left wheel brake mechanism 24 and the rear right wheel brake mechanism 26, and then increases the braking force of the rear left wheel brake mechanism 24 and the rear right wheel brake mechanism 26, in conjunction with increase of the braking force of the front left wheel brake mechanism 20 and front right wheel brake mechanism 22 given by the non-defective other control unit.

Note that, for the case where the second front wheel control unit 30 went into failure, it suffices to replace, in the description above, the "first front wheel control unit 28" with the "second front wheel control unit 30" vice versa.

Figure 5A:
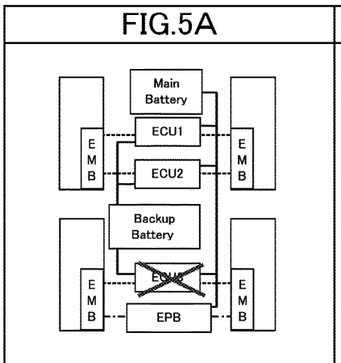
FIG. 5 is an explanatory drawing illustrating changes in braking force in case of control unit failure.

Next, an exemplary case of failure of the rear wheel control unit 32, illustrated in FIG. 5A, will be explained.

Figure 5B:
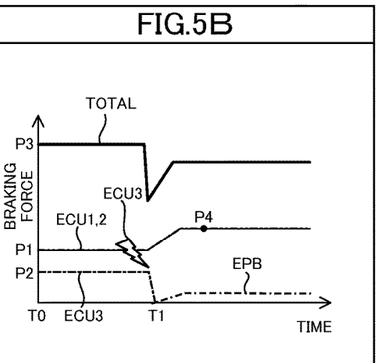

Referring now to FIG. 5B, at the initial time T0 when the failure has not occurred yet, both of the first front wheel control unit 28 and the second front wheel control unit 30 (ECU1, 2) operate the front left/right wheel brake mechanisms 20, 22 so as to produce predetermined braking force P1. In other words, the front left/right wheel brake mechanisms 20, 22 produce a braking force of P1×2 in total.

Meanwhile, the rear wheel control unit 32 (ECU3) operates the rear left/right wheel brake mechanisms 24, 26 so as to produce predetermined braking force P2 (<P1).

The braking force of the three control units 28, 30, 32 totals P3.

When the rear wheel control unit 32 (ECU3) went into failure at time T1, the power will no more be supplied from the rear wheel control unit 32 to the rear left/right wheel brake mechanisms 24, 26, and the braking force of the rear left/right wheel brake mechanisms 24, 26 will fall to zero.

In this process, both of the first front wheel control unit 28 and the second front wheel control unit 30 increase the power supply to the front left wheel brake mechanism 20 and the front right wheel brake mechanism 22, to thereby produce the braking force that totals P3 (>P1)×2.

Meanwhile, the parking control unit 38 operates the parking brake mechanisms 34, 36, to thereby produce the braking force for braking the rear wheels 16, 18.

Although the braking force of the parking brake mechanisms 34, 36 is smaller than those of the rear-left wheel brake mechanism 24 and the rear-right wheel brake mechanism 26 that are service brakes, it can apply a certain level of braking force to the rear wheels 16, 18, and thereby a higher level of braking force may be obtained.

In other words, when the rear wheel control unit 32 went into failure, both of the first front wheel control unit 28 and the second front wheel control unit 30 increase the braking force of the front left wheel brake mechanism 20 and front right wheel brake mechanism 22. Meanwhile, the parking control unit 38 activates the parking brake mechanisms 34, 36 to produce the braking force for the rear left wheel 16 and the rear right wheel 18.

Note that, referring to the ideal braking force distribution illustrated in FIG. 8, the front wheel brake mechanism is preset to produce larger braking force than that of the rear wheel brake mechanism. Therefore, it would otherwise be possible to perform braking by using the front left wheel brake mechanism 20 and the front right wheel brake mechanism 22 only, without activating the parking brake mechanisms 34, 36. However, operation of the parking brake mechanisms 34, 36 to produce the braking force, and to apply the braking force both to the front and rear of the vehicle, will effectively stabilize the vehicle posture, and will achieve a larger braking force.

Figure 6A:
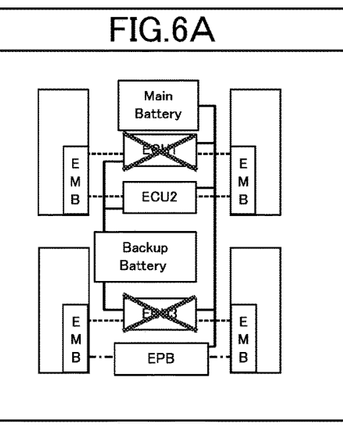
FIG. 6 is an explanatory drawing illustrating changes in braking force in case of control unit failure.

Next, an exemplary case where one of the front wheel control units (the first front wheel control unit 28 or the second front wheel control unit 30), and the rear wheel control unit 32 successively went into failure, illustrated in FIG. 6A, will be explained.

Figure 6B:
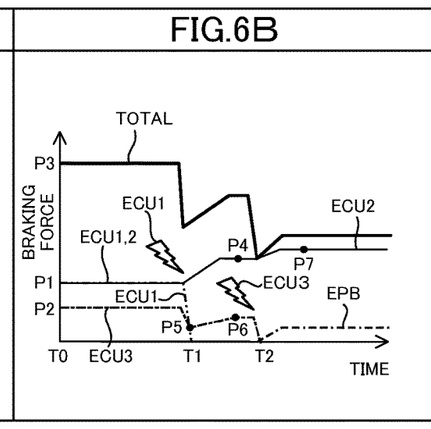

Referring now to FIG. 6B, an exemplary case where the first front wheel control unit 28 (ECU1) went into failure first, and the rear wheel control unit 32 (ECU3) went into failure next, will be explained.

As illustrated in FIG. 6B, at the initial time T0 when the failure has not occurred yet, both of the first front wheel control unit 28 and the second front wheel control unit 30 (ECU1, 2) operate the front left/right wheel brake mechanisms 20, 22 to produce predetermined braking force P1. In short, the front left/right wheel brake mechanisms 20, 22 produce a braking force of P1×2 in total.

Meanwhile, the rear wheel control unit 32 (ECU3) operates the rear left/right wheel brake mechanisms 24, 26 so as to generate predetermined braking force P2 (<P1).

The braking force of the three control units 28, 30, 32 totals P3.

When the first front wheel control unit 28 (ECU1) went into failure at time T1, the front left/right wheel brake mechanisms 20, 22 will no more be powered from the first front wheel control unit 28, and will be powered from the second front wheel control unit 30 only. The total braking force of the front left/right wheel brake mechanisms 20, 22 is therefore halved to P1×1.

In this case, the second front wheel control unit 30 (ECU2) increases the power supply to the front left/right wheel brake mechanisms 20, 22, so as to make the front left/right wheel brake mechanisms 20, 22 produce braking force P4 which is larger than P1×1.

Meanwhile, the rear wheel control unit 32 (ECU3) temporarily reduces, immediately after the failure of the first front wheel control unit 28, the power supply to the rear left/right wheel brake mechanisms 24, 26, to thereby reduce the braking force of the rear left/right wheel brake mechanisms 24, 26 down to P5 (<P2). This is, as described previously, for the purpose of preventing locking of the rear-left/right wheels 16, 18 (rear-locking) due to reduced braking force of the front wheel brake mechanisms 20, 22.

The rear wheel control unit 32 thereafter increases, in conjunction with increase of the braking force of the front left/right wheel brake mechanisms 20, 22, the braking force of the rear left/right wheel brake mechanisms 24, 26 up to P6, referring to the ideal braking force distribution characteristic.

Thereafter, when the rear wheel control unit 32 (ECU3) went into failure at time T2, the rear left/right wheel brake mechanisms 24, 26 will no more be powered from the rear wheel control unit 32, and the braking force of the rear left/right wheel brake mechanisms 24, 26 will fall to zero.

In this case, the second front wheel control unit 30 further increases the power supply to the front left wheel brake mechanism 20 and the front right wheel brake mechanism 22 so as to make the front left/right wheel brake mechanisms 20, 22 produce braking force P7 which is larger than P4.

Meanwhile, the parking control unit 38 activates the parking brake mechanisms 34, 36 to produce the braking force for braking the rear wheels 16, 18. Although the braking force of the parking brake mechanisms 34, 36 is smaller than those of the rear-left wheel brake mechanism 24 and the rear-right wheel brake mechanism 26 that are service brakes, it can apply a certain level of braking force to the rear wheels 16, 18.

In other words, when either one of the first front wheel control unit 28 and the second front wheel control unit 30, and also the rear wheel control unit 32 went into failure, the other one of the first front wheel control unit 28 and the second front wheel control unit 30 increases the braking force of the front left wheel brake mechanism 20 and the front right wheel brake mechanism 22, meanwhile the parking control unit 38 activates the parking brake mechanisms 34, 36 to produce the braking force for the rear left wheel 16 and the rear right wheel 18.

Now, an exemplary case where the rear wheel control unit 32 went into failure first, and one of the front wheel control units (the first front wheel control unit 28 or the second front wheel control unit 30) went into failure next, will be explained.

In this case, as illustrated in FIG. 5B, when the rear wheel control unit 32 went into failure, both of the first front wheel control unit 28 and the second front wheel control unit 30 increase the braking force of the front left wheel brake mechanism 20 and the front right wheel brake mechanism 22. Meanwhile the parking control unit 38 activates the parking brake mechanisms 34, 36 to brake the rear wheels 16, 18.

Thereafter, when one of the front wheel control units went into failure, the non-defective (other) front wheel control unit makes the front left/right wheel brake mechanisms 20, 22 produce a still larger braking force.

In short, irrespective of the order of occurrence of failures, the final state will be same as illustrated in FIG. 6.

Figure 7A:
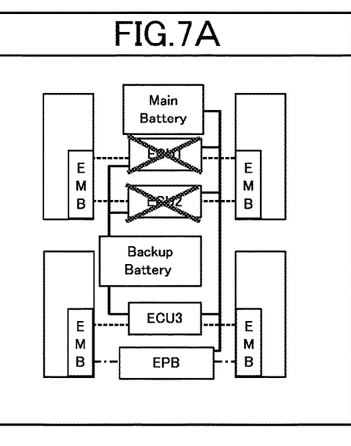
FIG. 7 is an explanatory drawing illustrating changes in braking force in case of control unit failure.

Next, an exemplary case where both of the front wheel control units (the first front wheel control unit 28 and the second front wheel control unit 30) successively went into failure, illustrated in FIG. 7A, will be explained.

Figure 7B:
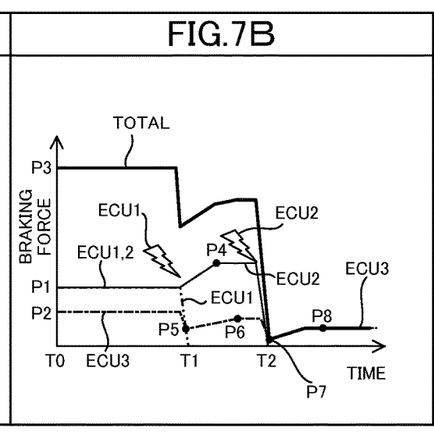

Referring now to FIG. 7B, an exemplary case where the first front wheel control unit 28 went into failure first, and the second front wheel control unit 30 went into failure next, will be explained.

As illustrated in FIG. 7B, at the initial time T0 when the failure has not occurred yet, both of the first front wheel control unit 28 and the second front wheel control unit 30 (ECU1, 2) operate the front left/right wheel brake mechanisms 20, 22 so as to produce predetermined braking force P1. In short, the front left/right wheel brake mechanisms 20, 22 produce a braking force of P1×2 in total.

Meanwhile, the rear wheel control unit 32 (ECU3) operates the rear-left/right brake mechanisms 24, 26, so as to produce predetermined braking force P2 (<P1).

The braking force of the three control units 28, 30, 32 totals P3.

When the first front wheel control unit 28 (ECU1) went into failures at time T1, the front left/right wheel brake mechanisms 20, 22 will no more be powered from the first front wheel control unit 28, and will be powered from the second front wheel control unit 30 only. Thus the total braking force of the front left/right wheel brake mechanisms 20, 22 is halved to P1×1.

In this case, the second front wheel control unit 30 (ECU2) increases the power supply to the front left/right wheel brake mechanisms 20, 22, to make the front left/right wheel brake mechanisms 20, 22 produce braking force P4 which is larger than P1×1.

Meanwhile, the rear wheel control unit 32 (ECU3) temporarily reduces, immediately after the first front wheel control unit 28 went into failure, the power supply to the rear left/right wheel brake mechanisms 24, 26, to thereby reduce the braking force of the rear left/right wheel brake mechanisms 24, 26 down to P5 (<P2). This is for the purpose of preventing locking of the rear-left/right wheels 16, 18 (rear-locking) due to reduced braking force of the front wheel brake mechanisms 20, 22.

The rear wheel control unit 32 thereafter increases, in conjunction with increase of the braking force of the front left/right wheel brake mechanisms 20, 22, the braking force of the rear left/right wheel brake mechanisms 24, 26 up to P6, referring to the ideal braking force distribution characteristic of the vehicle.

When the second front wheel control unit 30 (ECU2) went into failure at time T2, the front left/right wheel brake mechanisms 20, 22 will no more be powered, and the braking force of the front left/right wheel brake mechanisms 22, 24 will fall to zero.

Meanwhile the rear wheel control unit 32 (ECU3) reduces, also immediately after the second front wheel control unit 30 went into failure, the power supply to the rear left/right wheel brake mechanisms 24, 26, so as to reduce the braking force of the rear left/right wheel brake mechanisms 24, 26 down to P7 (<P6). This is for the purpose of preventing the rear wheel lock, as a result of sudden fall-to-zero of the braking force of the front wheel brake mechanisms 20, 22.

The rear wheel control unit 32 then gradually increases the power supply to the rear left/right wheel brake mechanisms 24, 26, and brake the vehicle with a braking force not enough to cause rear wheel lock (P8 in FIG. 7).

Note that, for the case where the second front wheel control unit 30 went into failure first, and the first front wheel control unit 28 went into failure next, it suffices to replace, in the description above, the "first front wheel control unit 28" with the "second front wheel control unit 30", and also the "front left wheel brake mechanism 20" with the "front right wheel brake mechanism 22" vice versa.

Other probable mode of failure is such that the rear wheel control unit 32 and the parking control unit 38 go into failure. In this case, it suffices to increase the braking force of the front left/right wheel brake mechanisms 20, 22 by using the first front wheel control unit 28 and the second front wheel control unit 30.

As has been explained above, according to the electric brake device 10 of the embodiment, in case of failure of at least one of the three control units 28, 30, 32, at least one of the non-defective control units temporarily reduces the braking force, posing an advantage of keeping a proper state of the braking force distribution between the wheel pairs, even if the braking force of the target brake mechanism under the control of the defective control unit should sharply fall.

According to the electric brake device 10, four brake mechanisms 20, 22, 24, 26 can be controlled by three control units 28, 30, 32, posing an advantage of reducing the quantity of parts for the electric brake device 10, and reducing the vehicle cost.

According to the electric brake device 10, in case of failure of one control unit, one of the non-defective other control units increases the braking force, and still another one of the non-defective other control units temporarily reduces the braking force, and then increases the braking force in conjunction with increase of the braking force given by such one of the other control units, posing an advantage of reserving the braking force for the entire vehicle, while preventing wheel lock.

According to the electric brake device 10, each of the first brake mechanism and the second brake mechanism is controlled by two control units, posing an advantage of enhancing availability of the first brake mechanism and the second brake mechanism.

In particular, according to the electric brake device 10, two control units 28, 30 are allocated to each of the brake mechanisms 20, 22 for the left and right front wheels, and a single control unit 32 is allocated to the rear wheel brake mechanisms 24, 26, so that even if one control unit should go into failure, the residual brake mechanism for the front wheel remains controllable, posing an advantage of enhancing redundancy of the front wheel brake whose importance in braking is higher.

According to the electric brake device 10, the non-defective control unit reduces the braking force based on the ideal braking force distribution value preset to the vehicle, posing an advantage of stabilizing the vehicle posture during braking.

In particular, when at least one of the first front wheel control unit 28 and the second front wheel control unit 30 went into failure, the electric brake device 10 temporarily reduces the braking force of the rear wheel brake mechanisms 24, 26, posing an advantage of preventing rear wheel lock as a result of deviation of the braking force distribution over the front and rear wheels from the ideal braking force distribution, when the front wheel control unit went into failure, and the braking force of the front wheel brake mechanisms 20, 22 sharply fell.

The electric brake device 10 temporarily reduces, in case of failure of one of the front wheel control units 28, 30, the braking force of the rear wheel brake mechanisms 24, 26, and then increases the braking force of the rear wheel brake mechanisms 24, 26, in conjunction with increase of the braking force of the front wheel brake mechanisms 20, 22 given by the other one of the front wheel control units 28, 30, posing an advantage of reserving the braking force for the entire vehicle, while preventing rear wheel lock.

The brake device 10 increases, when the rear wheel control unit 32 went into failure, the braking force of both of the front left wheel brake mechanism 20 and the front right wheel brake mechanism 22, posing an advantage of reserving a braking force nearly equal to that before the failure, while balancing the braking force in the crosswise direction of vehicle.

The electric brake device 10 activates, when the rear wheel control unit 32 went into failure, the parking brake mechanisms 34, 36 to produce the braking force for the rear left wheel 16 and the rear right wheel 18, making it possible to prevent the braking force distribution over the front and rear wheels from varying extremely, and to obtain a larger braking force.

When one of the front wheel control units 28, 30, and also the rear wheel control unit 32 went into failure, the electric brake device 10 makes the front wheel control units 28, 30 increase the braking force for the front wheel brake mechanisms 20, 22, and makes the parking brake mechanisms 34, 36 operate so as to produce the braking force for the rear left wheel 16 and the rear right wheel 18, posing advantages of preventing the braking force distribution over the front and rear wheels from varying extremely, stabilizing the vehicle posture, stabilizing the vehicle posture, and reserving a braking force nearly equal to that before the failure.

According to the electric brake device 10, the individual brake mechanisms 20, 22, 24, 26 obtain the braking force by pressing the friction-applying member, while being powered by the electric actuator, against the friction-receiving member that rotates together with the wheel, posing advantages of improving responsiveness to the brake operation as compared with the conventional hydraulic brake, and enabling various modes of brake operation adopted to the vehicle conditions.

According to the electric brake device 10, a disk brake system with a high heat radiation performance is built by employing a brake disk as the friction-receiving member, and a brake pad as the friction-applying member, posing an advantage of improving durability of the brake mechanism.

In the electric brake device 10, if the rear-left wheel brake mechanism 24 and the rear-right wheel brake mechanism 26 are designed to also function as the parking brake mechanisms 34, 36, the device will be advantageous in terms of reducing vehicle weight and simplifying vehicle configuration, as compared with the case where a dedicated parking brake mechanism is provided.

In the electric brake device 10, if an additional brake system is provided at the center of the brake disk to configure the parking brake mechanisms 34, 36, the device will be advantageous in terms of relieving the load of the individual brake mechanisms, as compared with the case where the rear-left wheel brake mechanism 24 and the rear-right wheel brake mechanism 26 also function as the parking brake mechanisms 34, 36.

The electric brake device 10 has two batteries for supplying power to the brake mechanisms 20, 22, 24, 26, so that if the main battery 40 should go into failure, the sub-battery 42 can activate the brake mechanisms 20, 22, 24, 26, posing an advantage of improving redundancy of the brake mechanisms 20, 22, 24, 26.

In the embodiment described above, although the definition was that the four wheels of vehicle include a first wheel pair composed of a first wheel and a second wheel arranged leaving a space in between in the width direction of vehicle, and a second wheel pair composed of a third wheel and a fourth wheel arranged leaving a space in between in the width direction, and arranged leaving a space from the first wheel pair in the length direction of vehicle, where the first wheel corresponds to the front-left wheel 12, the second wheel to the front-right wheel 14, the third wheel to the rear-left wheel 16, and the fourth wheel to the rear-right wheel 18, the definition may alternatively be such that the first wheel corresponds to the rear-left wheel 16, the second wheel to the rear-right wheel 18, the third wheel to the front-left wheel 12, and the fourth wheel to the front-right wheel 14.

In this case, the brake mechanisms 24, 26 for the rear-left/right wheels 16, 18 will be controlled independently by two control units (first control unit, second control unit), and the brake mechanisms 20, 22 for the front-left/right wheels 12, 14 will be controlled by a single control unit (third control unit).

Figure 9:
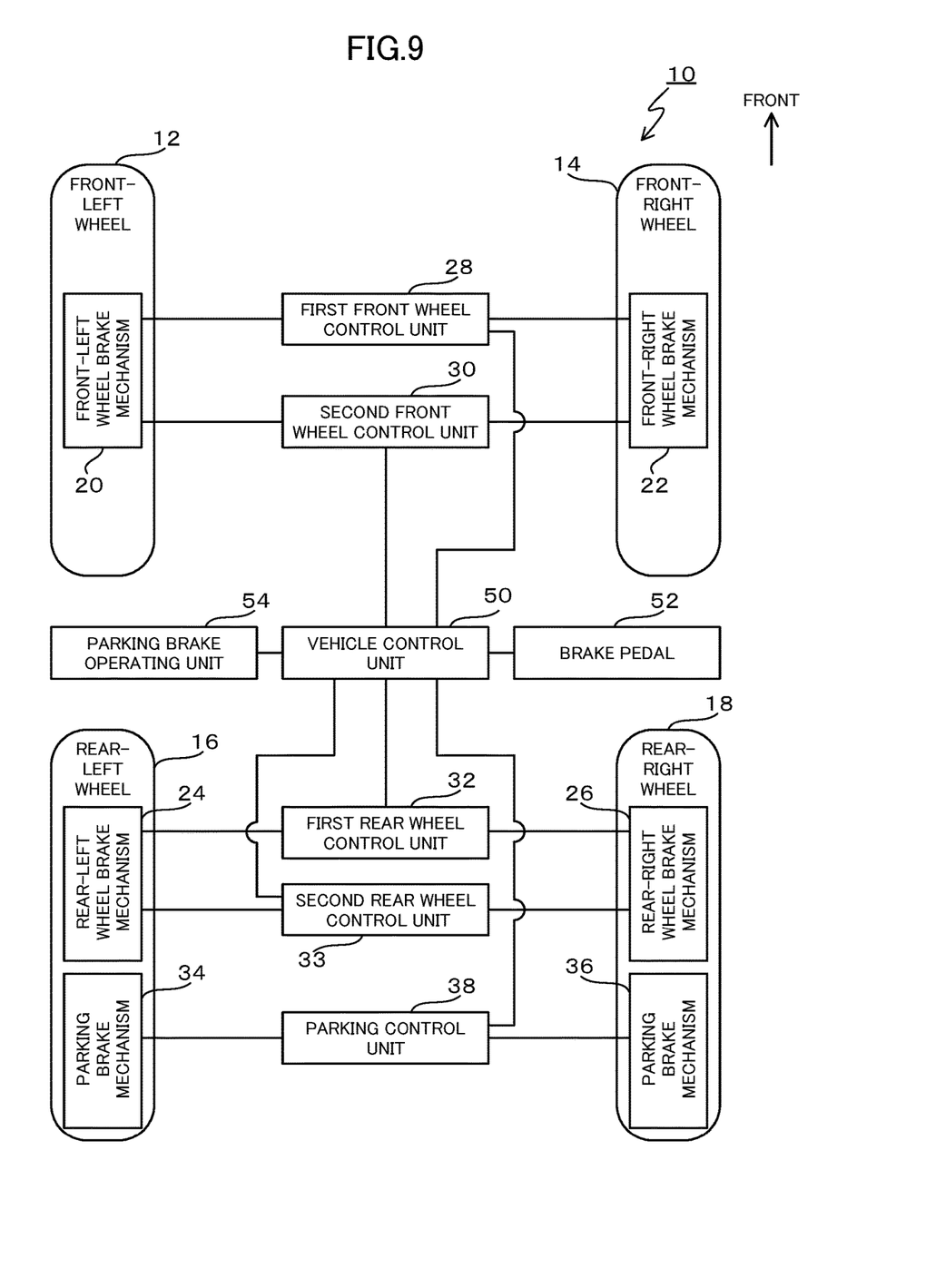
FIG. 9 illustrates an Example of the electric brake device that employs four control units.

Although the above embodiment has described the case where the brake mechanisms 20, 22, 24, 26 of four wheels 12, 14, 16, 18 were controlled by three control units 28, 30, 32, it is alternatively possible to provide four or more control units as illustrated in FIG. 9.

In an example illustrated in FIG. 9, as a control unit for controlling the rear-left/right wheel brake mechanisms 24, 26, a second rear wheel control unit 33 is provided besides the rear wheel control unit (first rear wheel control unit) 32.

In this case, when the first front wheel control unit 28 went into failure, the braking force of the second front wheel control unit 30 will be elevated. In this case, the first and second rear wheel control units 32, 33 temporarily reduce the braking force so as to avoid rear wheel lock, and then elevate the braking force referring to the ideal braking force distribution.

Also for the case where the second front wheel control unit 30 went into failure, the operation is same as in the case where the first front wheel control unit 28 went into failure.

When the first rear wheel control unit 32 went into failure, the braking force of the second rear wheel control unit 33 is elevated. Also the first and second front wheel control units 28, 30 individually elevate the braking force.

Also for the case where the second rear wheel control unit 33 went into failure, the operation is same as in the case where the first rear wheel control unit 32 went into failure.

In case of failure of the first and second front wheel control units 28, 30, the first and second rear wheel control units 32, 33 perform braking only to the extent the rear wheels would not be locked.

In case of failure of the first front wheel control unit 28 and the first rear wheel control unit 32, the braking force of the second front wheel control unit 30 and the second rear wheel control unit 33 is elevated.

Also for the case where the first front wheel control unit 28 and the second rear wheel control unit 33 went into failure, or for the case where the second front wheel control unit 30 and the first rear wheel control unit 32 went into failure, or for the case where the second front wheel control unit 30 and the second rear wheel control unit 33 went into failure, the operations are same as those in the case where the first front wheel control unit 28 and the first rear wheel control unit 32 went into failure.

In case of failure of the first and second rear wheel control units 32, 33, the braking force of the first and second front wheel control units 28, 30 is elevated.

In this way, a stable braking will be provided even in case of such double failure of the control units.

REFERENCE SIGNS LIST

10 electric brake device; 12 front-left wheel; 14 front-right wheel; 16 rear-left wheel; 18 rear-right wheel; 20 front-left wheel brake mechanism; 22 front-right wheel brake mechanism; 24 rear-left wheel brake mechanism; 26 rear-right wheel brake mechanism; 28 first front wheel control unit; 30 second front wheel control unit; 32 rear wheel control unit, 34, 36 parking brake mechanism; 38 parking control unit; 40 main battery; 42 backup battery; 50 vehicle control unit; 52 brake pedal; 54 parking brake operating unit.

The invention claimed is:

1. An electric brake device for a vehicle comprising:
   a first brake mechanism for braking a first wheel;
   a second brake mechanism for braking a second wheel;
   a third brake mechanism for braking a third wheel;
   a fourth brake mechanism for braking a fourth wheel; and
   at least three control units,
   wherein each control unit controls at least any one of the four brake mechanisms,
   in case at least one of the three control units is defective, at least one of the non-defective control units temporarily reduces the braking force of its target brake mechanism, and
   wherein, in case the at least one of the three control units is defective, one of the non-defective control units increases the braking force of its target brake mechanism; and another one of the non-defective control units temporarily reduces the braking force of its target brake mechanism, and then the another one of the non-defective control units increases the braking force of its target brake mechanism in conjunction with increasing of the braking force by the one of the non-defective control units.

2. The electric brake device according to claim 1, wherein the first wheel and the second wheel are arranged leaving a space in between in a width direction of the vehicle; and the third wheel and the fourth wheel are arranged leaving a space in between in the width direction, and also arranged leaving a space from the first wheel and the second wheel in a length direction of the vehicle,
   the three control units are a first control unit, a second control unit and a third control unit,
   the first control unit controls the first brake mechanism and the second brake mechanism,
   the second control unit controls the first brake mechanism and the second brake mechanism, and
   the third control unit controls the third brake mechanism and the fourth brake mechanism.

3. The electric brake device according to claim 2, wherein an ideal braking force distribution value in the length direction of vehicle is preset, between a first brake pair composed of the first brake mechanism and the second brake mechanism, and a second brake pair composed of the third brake mechanism and the fourth brake mechanism, and
   the non-defective other control unit temporarily reduces the braking force of its target brake mechanism to a value that is lower than the ideal braking force distribution value.

4. The electric brake device according to claim 1, wherein each of the brake mechanisms is connected to a main battery and a backup battery that serve as power sources for controlling and activating the brake mechanisms, and, in case of main battery failure, the power source for each brake mechanism is switched to the backup battery.

5. The electric brake device according to claim 4, wherein the main battery and the backup battery supply power preferentially to the brake mechanisms that brake the front wheels of the vehicle.

6. The electric brake device according to claim 1, wherein the first wheel is a front left wheel, the second wheel is a front right wheel, the third wheel is a rear left wheel, the fourth wheel is a rear right wheel,
   the first brake mechanism is a front left wheel brake mechanism, the second brake mechanism is a front right wheel brake mechanism, the third brake mechanism is a rear left wheel brake mechanism, the fourth brake mechanism is a rear right wheel brake mechanism,
   the first control unit is a first front wheel control unit, the second control unit is a second front wheel control unit, and the third control unit is a rear wheel control unit.

7. The electric brake device according to claim 6, wherein, in case of failure of at least one of the first control unit and the second control unit, the third control unit temporarily reduces the braking forces of the rear left wheel brake mechanism and the rear right wheel brake mechanism.

* * * * *